United States Patent
Alameh et al.

[11] Patent Number: 6,118,567
[45] Date of Patent: Sep. 12, 2000

[54] EFFICIENT ENCODING AND DETECTION METHOD AND DEVICE FOR BINARY INTENSITY MODULATED OPTICAL DATA SIGNALS

[75] Inventors: Rachid M. Alameh, Schaumburg; Bruce C. Eastmond, Downers Grove; Thomas J. Walczak, Woodstock, all of Ill.

[73] Assignee: Motorola, Inc., Schaumburg, Ill.

[21] Appl. No.: 08/940,905

[22] Filed: Sep. 30, 1997

[51] Int. Cl.$^7$ .............................. H04B 10/06; H04B 1/10; H04B 10/00
[52] U.S. Cl. .......................... 359/189; 359/189; 359/194; 359/195; 359/154; 375/350
[58] Field of Search ..................... 359/184, 186, 359/189, 194, 195, 154; 370/205, 212, 213, 347, 442; 375/238, 239

[56] References Cited

U.S. PATENT DOCUMENTS

| | | | |
|---|---|---|---|
| 4,748,686 | 5/1988 | Glomb | 455/605 |
| 4,850,048 | 7/1989 | Mohr | 455/616 |
| 5,923,454 | 7/1999 | Eastmond et al. | 359/189 |

*Primary Examiner*—Jason Chan
*Assistant Examiner*—Mohammad Sedighian

[57] ABSTRACT

A waveform encoding method and device provide for generating/receiving a power efficient binary intensity modulated optical data signal from a binary source signal which minimizes a time between adjacent pulse transitions and maximizes a pulse peak amplitude for transmission over a low-power wireless infrared link. In generating the signal, the method includes: generating a Q-ary pulse position modulation, Q-PPM, encoded data signal from binary data where Q represents $2^L$ time slots and L is a predetermined integer representing a predetermined number of binary source bits of the power efficient binary intensity modulated optical data signal; generating an efficient binary intensity modulated signal by increasing the pulse peak amplitude of the Q-PPM encoded data signal by a factor of k, k a predetermined value, and decreasing a pulse width of the Q-PPM encoded data signal by k; and transmitting the efficient binary intensity modulated signal over the low-power wireless infrared link.

8 Claims, 6 Drawing Sheets

EFFICIENT ENCODING AND DETECTION METHOD AND DEVICE FOR BINARY INTENSITY MODULATED OPTICAL DATA SIGNALS

FIELD OF THE INVENTION

This invention relates to efficient encoding and detection schemes for binary-coded intensity modulated optical data signals that are suitable for low power, battery-operated portable devices operating in brightly illuminated areas.

BACKGROUND OF THE INVENTION

Infrared (IR) communication systems in which the transmitted signal may be diffusely scattered are assuming an increasing importance in wireless links among terminals, phones, pagers, PDAs, fax equipment, and other portable devices. IR systems are competitive with radio frequency technologies, which are influenced to a greater extent by interference and spectrum availability. IR is especially attractive in applications where communication takes place over a short range, and for systems which require a high data rate or a low-cost implementation. The Infrared Data Association (IrDA) has created specifications for point-to-point IR systems operating at 4 Mb/s or less, and specifications for other systems are being determined as an ongoing process.

The signal power, $P_{signal}$ [W], developed in a load resistor, $R[\Omega]$, which results from current generated in a receiving photodiode having responsivity, $S_\lambda[A/W]$, in response to optical signal power $P_{collected\_signal}$ [W] collected by the receiver optical system is given by $$P_{signal} = (P_{collected\_signal} S_\lambda)^2 \cdot R. \qquad \text{Eq. 1}$$

The ratio of the mean signal power, S [W], to the noise power, N [W], for the infrared detection process is limited either by thermal noise generated in the photodiode load resistor or its equivalent, by random electron motion, or by shot noise generated in the optical detector itself due to background illumination. When thermal noise current is dominant, the noise power, $P_{thermal\_noise}$ [W], developed in R is given by $$P_{thermal\_noise} = 4 \cdot k \cdot T \cdot B, \qquad \text{Eq. 2}$$

where k is Boltzmann's constant and B [Hz] is the system bandwidth. The S/N for a thermal noise limited system is given by $$\left.\frac{S}{N}\right|_{N=thermal} = \left(\frac{S_\lambda^2 \cdot R}{4 \cdot k \cdot T \cdot R}\right) \cdot \text{collected\_signal}^2 \cdot \qquad \text{Eq. 3}$$

When shot noise current is dominant, the noise power, $P_{shot\_noise}$ [W], developed in R is given by $$P_{shot\_noise} = 2 \cdot e \cdot S_\lambda \cdot P_{collected\_background} \cdot B \cdot R, \qquad \text{Eq. 4}$$

where e [couloumbs] is the electronic charge and $P_{collected\_background}$ [W] is the optical power due to background illumination collected by the receiver optical system. The S/N for a shot noise limited system is given by $$\left.\frac{S}{N}\right|_{N=shot} = \left(\frac{S_\lambda}{2 \cdot e \cdot B}\right) \frac{P_{collected\_signal}^2}{P_{collected\_background}} \qquad \text{Eq. 5}$$

For wireless optical systems in a home or office environment, shot noise current due to ambient lighting or sunlight is frequently the dominant source of noise. In addition, such systems commonly employ optical signal sources which incorporate semiconductor light-emitting diodes or diode lasers having an optical output power which is directly proportional to the current through the device. The average dissipation of these semiconductor devices is constrained due to thermal dissipation limitations and health and safety regulations. Moreover, wireless optical systems are frequently a part of portable devices which must use low current to ensure maximum battery life.

Thus, there is a need for an efficient encoding and detection method and device for binary intensity modulated optical data signals.

DETAILED DESCRIPTION OF A PREFERRED EMBODIMENT

Figure 1:
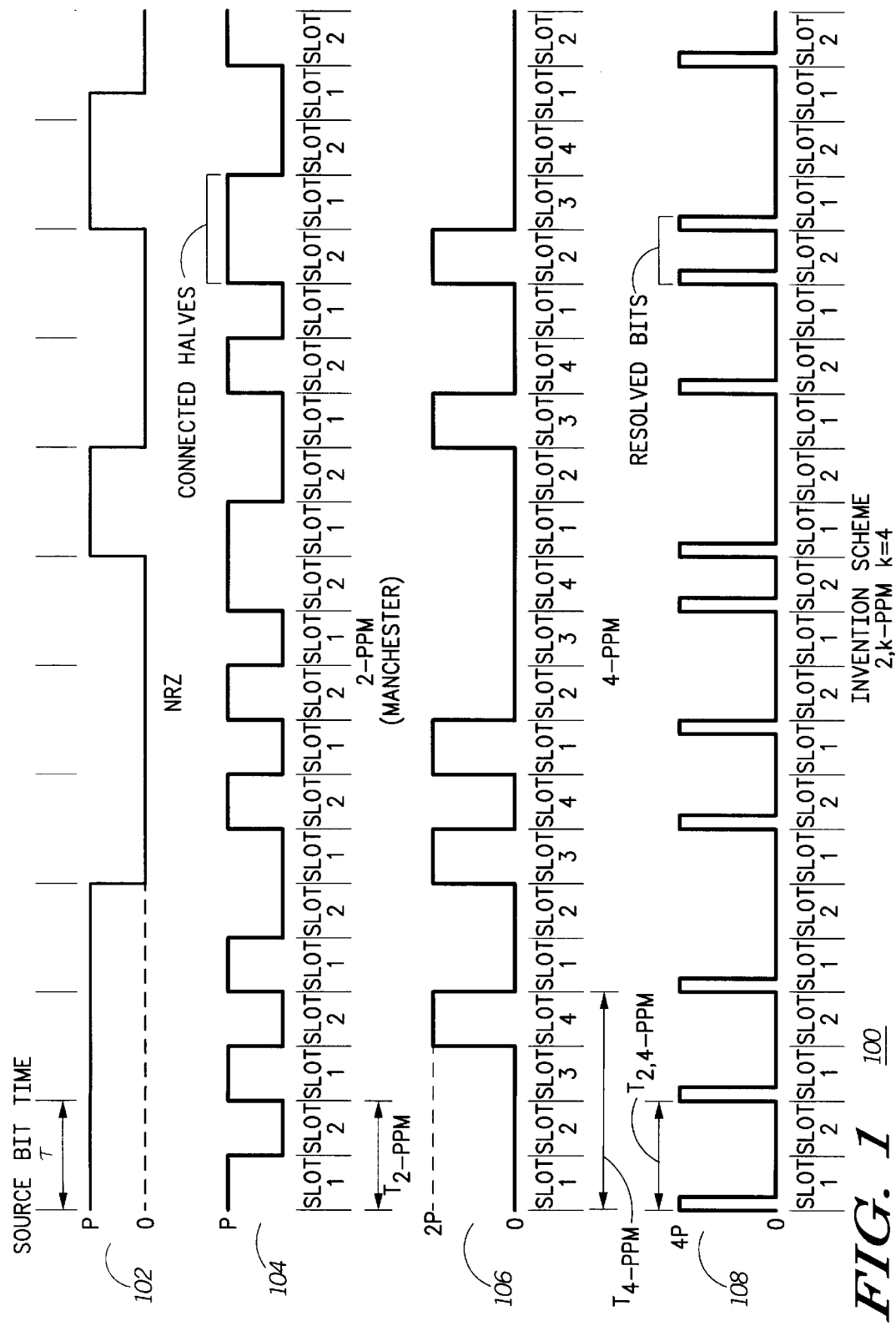
FIG. 1 illustrates a time line representation for NRZ, 2-PPM, 4-PPM, and 2,4-PPM encoding schemes having the same average power.

For any digital communication system, the probability of a bit error exhibits an inverse exponential dependence on the dimensionless parameter $E_b/N_o$, where $$E_b[W \cdot s] = S \cdot \Delta t, \quad \Delta t = T_{bit} \qquad \text{Eq. 6}$$

is the average energy per bit, and $N_o$ [W/Hz] is the power spectral density of the noise. When the optical signal source average power is constrained and the detector is shot noise limited, then S/N $(P_{collected\_signal})^2$ and it is particularly advantageous to make $\Delta t < T_{bit}$ and to increase the transmitted optical power in the same proportion.

Shortening the pulse duty cycle requires that the receiver bandwidth be increased in order to accommodate the more rapid change in amplitude. For the shot noise limited case, it can be shown that the system range ratio, r'/r, is given by $$\frac{r'}{r} = \left(\frac{I'_{source}}{I_{source}}\right)^{\frac{1}{2}} \cdot \left(\frac{S'_\lambda}{S_\lambda}\right)^{\frac{1}{4}} \cdot \left(\frac{A'}{A}\right)^{\frac{1}{4}} \cdot \left(\frac{B}{B'}\right)^{\frac{1}{4}}, \qquad \text{Eq. 7}$$

where r and r' are the ranges for two systems operating at a given S/N under the same environmental conditions, $I_{source}$ and $I'_{source}$ [W/steradian] are the source radiant intensities, A and A' are the effective photodiode collection areas, $S_\lambda$ and $S'_\lambda$ are the photodiode responsivities, and B and B' are the receiver electrical bandwidths. From equation 7, it is clear that the range improvement in a shot noise-limited case is proportional to the square root of the source radiant intensity but inversely proportional to the receiver bandwidth raised to the one fourth power.

As is known in the art, a reduction in the pulse duty cycle, which in turn permits the source intensity and collected power to be increased, can be obtained by the use of Q-ary pulse-position modulation (Q-PPM). A further advantage of Q-PPM encoding is that the waveform does not contain a dc component, which in turn permits the use of high-pass networks in the receiver to reject fluorescent light and other interference sources and the establishment of a slicing threshold having a value which is between the maximum and minimum amplitudes of the data signal.

In conventional Q-PPM, L-binary source bits are transmitted as a single light pulse in one of $Q=2^L$ possible time slots once every T seconds. The output waveform has constant average power, and a peak power which is Q times greater than the average power. Q=2 (Manchester-encoding) and Q=4 are frequently employed since a meaningful increase in peak power is obtained without incurring synchronization problems due to an extended time between data transitions.

Utilizing the present invention, the peak-to-average power obtained with Q-PPM, may be increased for any Q by increasing the pulse amplitude by a factor K and reducing the pulse duration by the same factor, thus keeping the average power constant. Using the improved PPM of the invention, a system in which Q=2, and K=4 is shown to provide an advantage in communication range when compared with prior-art 2-PPM systems, and in clock synchronization when compared with prior-art 4-PPM systems.

To illustrate this improvement, a comparison (100) among NRZ signal (102), 2-PPM (Manchester-encoded) signal (104), 4-PPM signal (106), and the disclosed 2,K-PPM signal (108) with k=4, all having the same average power, is shown in FIG. 1. Signal (102) corresponds to the binary data signal to be transmitted. Signal (104) is the 2-PPM-encoded representation of (102), in which one pulse with a peak amplitude P is transmitted in one of two available time slots. The 2-PPM signal can easily be generated by combining signal (102) with its associated clock signal. Signal (106) is the 4-PPM encoded representation of (102), in which one pulse with a peak amplitude 2P is transmitted in one of 4 available time slots spanning two bit times.

Referring to Eq. 7, 2-PPM signal (104), and 2,K-PPM signal (108), the range of 2,4-PPM relative to 2-PPM is $(4)^{1/2}(0.25)^{1/4}=(2)^{1/2}$, an increase of 41.4%. Referring to Eq. 7, 4-PPM signal (106) and 2,4-PPM signal (108), the range of 2,4-PPM relative to 4-PPM is $(2)^{1/2}(0.25)^{1/4}=1$, which is equivalent.

The stability and acquisition time of a data clock is related to the maximum number of bits which separate adjacent signal transitions. Referring to 2-PPM signal (104), and 2,4-PPM signal (108), the maximum number of bits separating adjacent signal transitions is three in each case, which is equivalent. Referring to 4-PPM signal (106) and 2,4-PPM signal (108), the maximum number of bits separating adjacent signal transitions is twice as long for the 4-PPM signal (106) as for the 2,4-PPM signal (108).

So it is apparent that in a background-limited environment, where power dissipation is limited by the portable device's battery, the disclosed 2,K-PPM encoding demonstrates advantages in clock acquisition, synchronization maintenance, and range.

In addition to the disclosed 2,k-PPM modulation scheme, two receiver-specific implementations can be used to advantage to enhance reception under shot-noise limited conditions in battery-powered portable devices:

First, is the use of logarithmic receivers to detect signals which must be high-pass filtered to reject low-frequency interference which occurs in areas which are brightly illuminated from ambient sources such as fluorescent and incandescent lighting, and sunlight. This implementation is discussed in detail below with respect to the preferred receiver embodiment as set forth in FIG. 2 and the receiver signal diagram of FIG. 4.

The spectrum of a detected fluorescent light source may extend in frequency to a few hundreds kilohertz. In order to adequately filter out this disturbance, optical and high-pass electrical filtering with a cutoff frequency exceeding several hundred kilohertz must be used. This filter differentiates the binary data signal, resulting in positive and negative pulses at the edges of each data bit as shown in the differentiated signal (404). A simple detector with threshold set above the noise floor can detect either the positive or the negative differentiated pulses; however, a logarithmic receiver responds to both positive and negative pulses which doubles the detected energy per bit. Because the differentiated pulses occur on the edges of the bit, a null exists between the two pulses. The null can be eliminated using peak detection followed by filtering. This is explained in detail below with respect to the receiver preferred embodiment with reference to FIGS. 2 and 4.

Second, the use of a high-pass coupling network at the logarithmic receiver output allows the detected signal to dynamically track the fixed detection threshold. This tracking mechanism is due to the inherent logarithmic receiver characteristic which alters the rise and fall time of the received pulse, and thus the signal average level, as a function of the signal strength at the receiver input. At strong signal levels, the increase in the fall time due to the logarithmic processing increases the mean of the high-pass filtered signal, which increases the difference between the detection threshold and the noise floor and reduces the probability of a false detection due to random noise fluctuations. At weak signal levels, the reduction in fall time decreases the difference between the detection threshold and the noise floor and increases the detection probability. A detailed discussion of this mechanism is found in the description of the preferred receiver embodiment below with reference to FIGS. 2 and 4.

Figure 2:
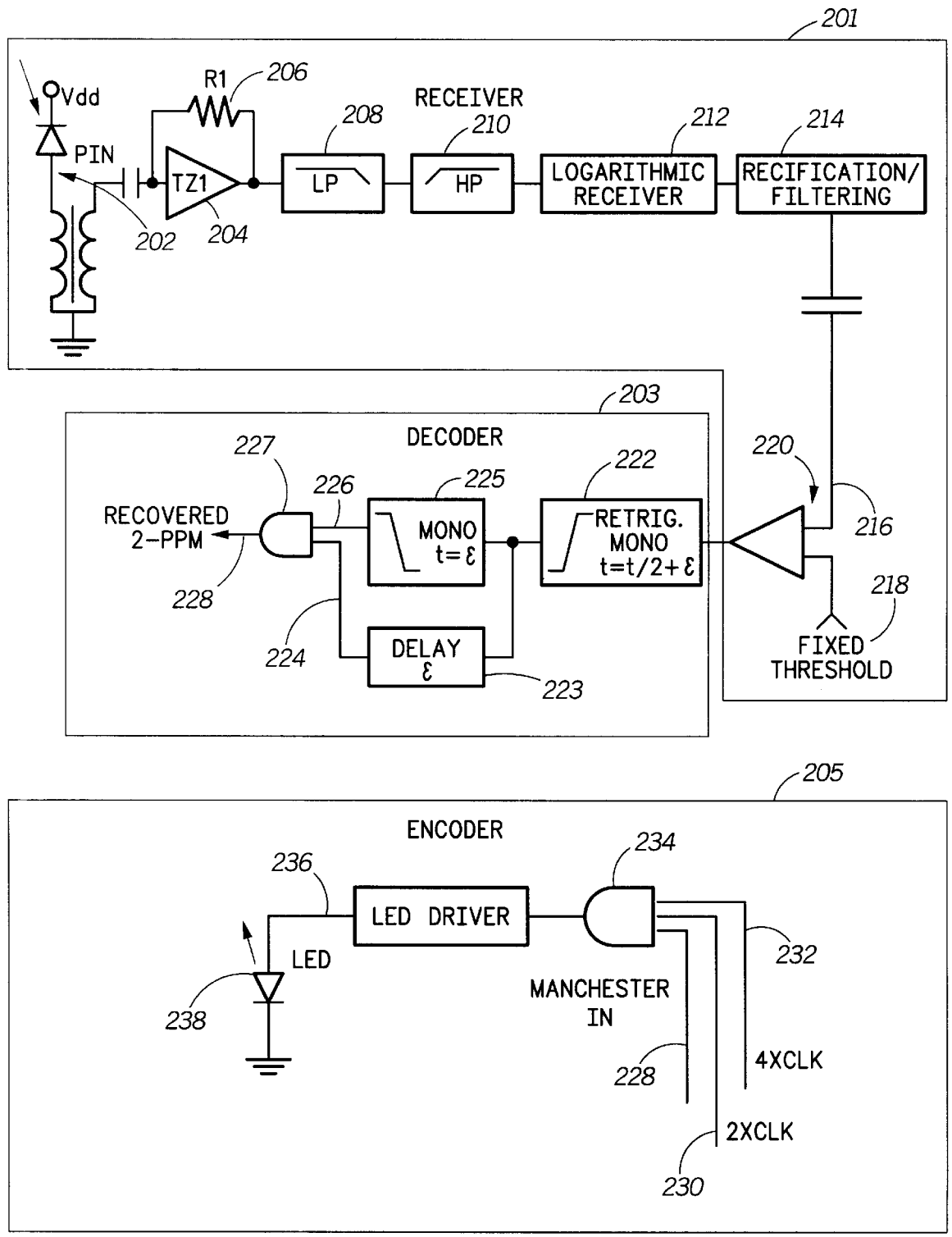
FIG. 2 is a block diagram of a preferred embodiment for an encoder, a transmitter, a receiver, and a decoder in accordance with the present invention.
Figure 3:
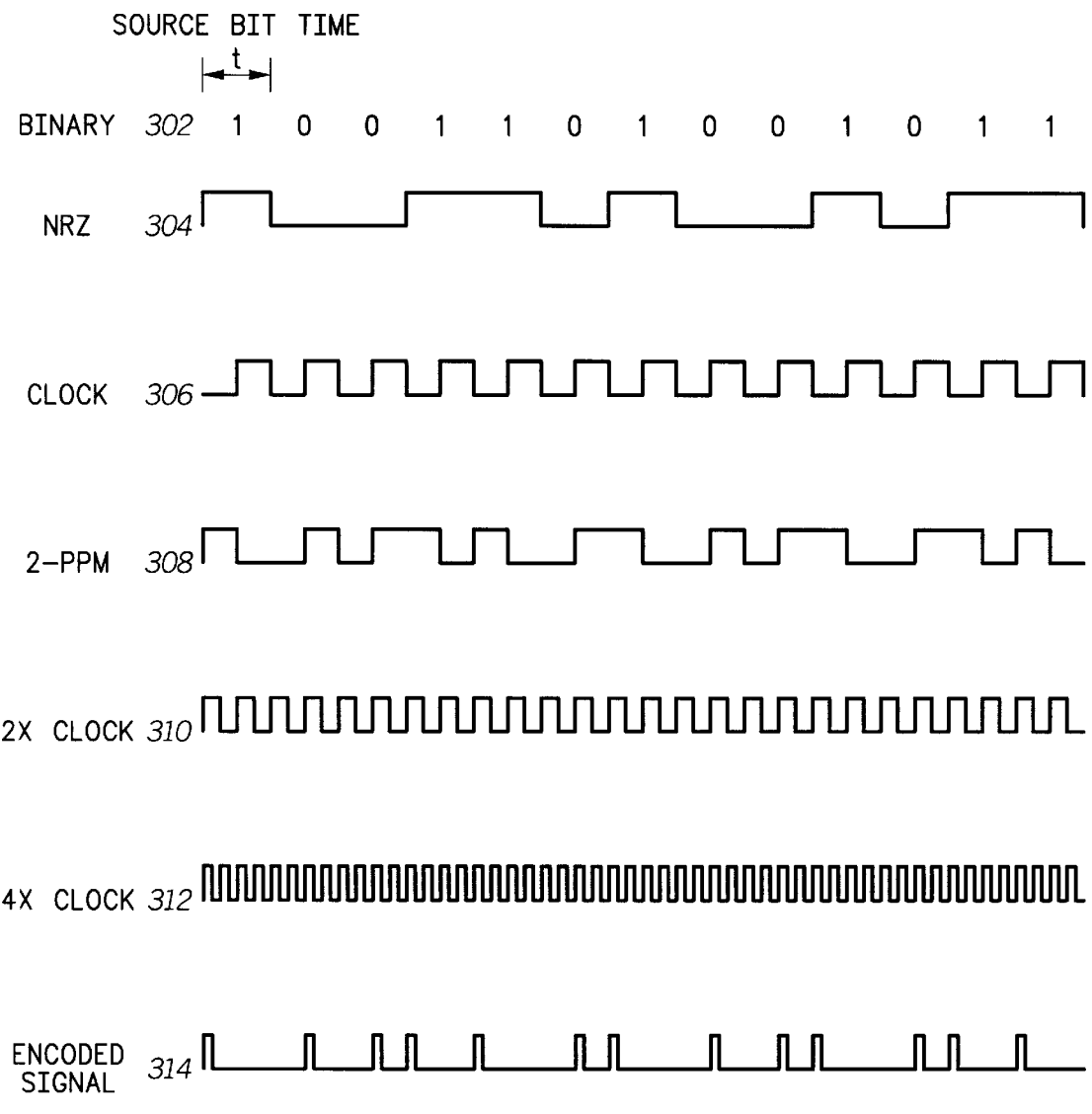
FIG. 3 illustrates an encoder signal diagram in accordance with the present invention.

A preferred embodiment of an encoder in accordance with the present invention is shown in FIG. 2 and described in the encoder signal diagram of FIG. 3.

With reference to FIG. 3, data (302) represent the binary sequence to be modulated and transmitted over the IR system. (304) is an NRZ representation of (302). 2-PPM (Manchester) encoding is then applied on signal (304). This can easily be implemented with an Exclusive OR gate driven by the NRZ signal (304) and a corresponding clock (306). The 2-PPM signal is shown in (308). Clock (310) has a frequency equals to twice that of clock (306). Clock (312) has a frequency equals to four times that of clock (306). Both clocks (310) and (312) are used in the encoding process. Clocks (310) and (312) are logically ANDed with the 2-PPM signal (308) resulting in the encoded signal (314). This is also shown in diagrammatic form in the encoder described below with respect to FIG. 2.

Clock (312) sets the pulse width of the encoded signal (314). In the current implementation, the pulse width of the encoded signal is set to ⅛th the source bit time "τ" marked in FIG. 3. If narrower pulses are required, then faster clocks may be employed. A close look at (314) shows that at least one pulse is guaranteed to occur in any 1.5 2-PPM data bit interval with one pulse being transmitted per bit thus setting a lower limit on the frequency content of the transmitted signal. This knowledge is then effectively utilized to heavily filter out interference that usually dominate at low frequencies such as fluorescent and incandescent light sources which gravely affect IR receivers. The lowest pulse rate as seen in (314) is 2/(3τ) with "τ" corresponding to one source bit time.

The encoded data (314) has imbedded clock and therefore no external clock is needed at the receiver side to recover the data. An advantageous outcome is the fact that a pulse is generated regardless of the bit sequence. That eliminates the dc drift and synchronization problems that other systems encounter during all 1's and all 0's data sequences. In such cases, one proposed solution consists of the transmission of a minimum number of flashes which in turn reduces the system efficiency.

Figure 4:
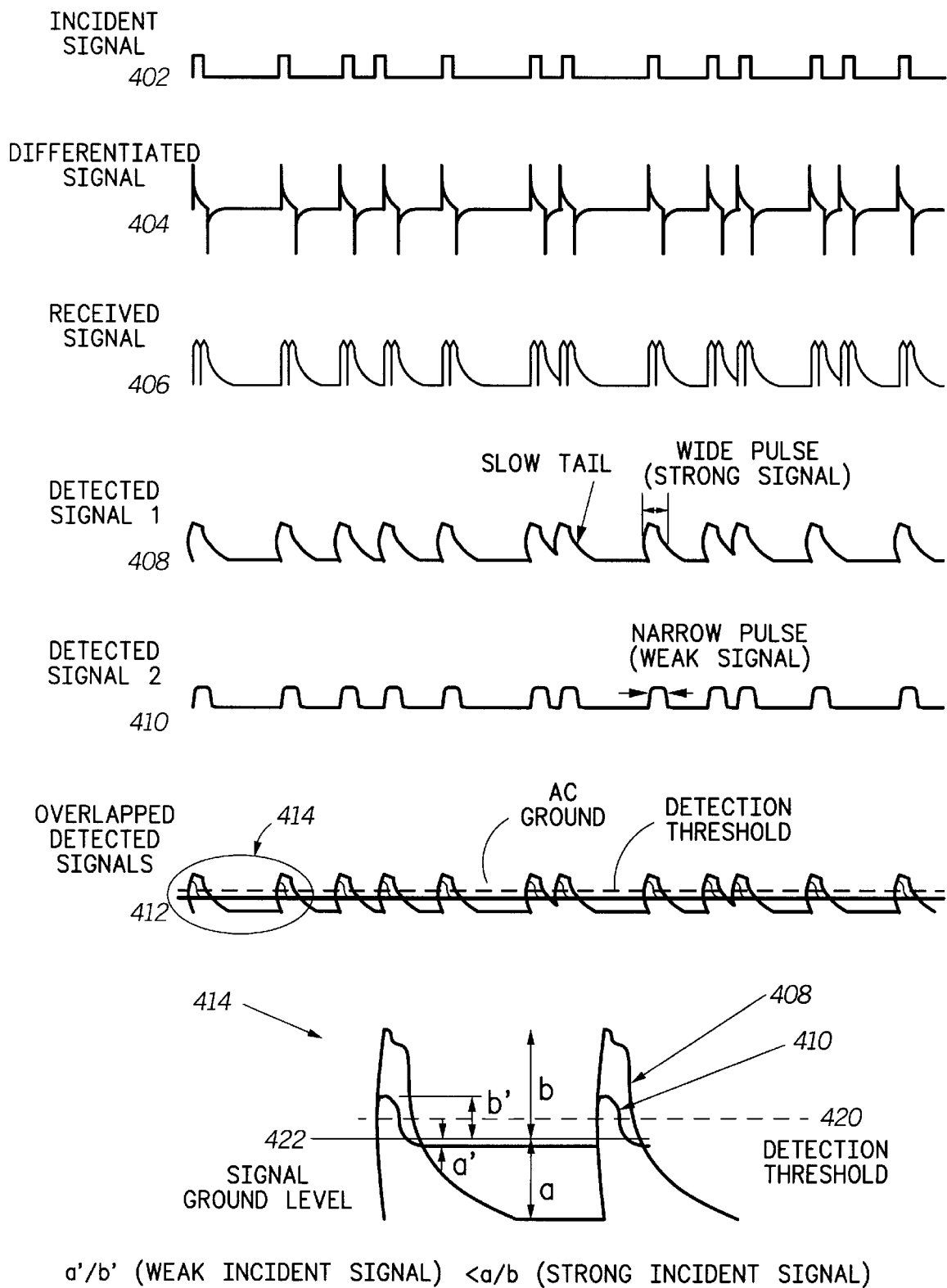
FIG. 4 illustrates a receiver signal diagram in accordance with the present invention.

A preferred receiver implementation is shown in the preferred embodiment of FIG. 2 and described in the receiver signal diagram of FIG. 4. This implementation is very suitable for the disclosed modulation scheme as will be shown next.

With reference to FIG. 2, the receiver (201) incorporates a photodetector to transform the incident IR signal into electrical current. Following the photodetector is a front-end transformer (202) used to prevent overloading the receiver front end under strong interference illumination. The transformer is then ac-coupled into a transimpedance stage (204) having a resistor (206) which provides pre-amplification for the generated electrical current. The signal at the output of the transimpedance amplifier is then low-pass filtered (208) to optimize the signal to noise ratio, hi-pass filtered-differentiated (210) to reject background and fluorescent light interference, and applied at the logarithmic receiver (212) input. The detected signal at the receiver output is rectified/filtered (214), ac-coupled (216), and compared to a fixed threshold (218). The output of the comparator (220) is then used to drive the decoder (203) described in detail below with reference to FIG. 2 and the decoder signal diagram of FIG. 5.

The three inputs to the encoder (205) correspond to the output from the decoder (203), a 2×clock signal (230) and a 4×clock signal (232), which are input into an adder (234) from which the output is sent to an LED driver (236) which outputs to an LED (238).

Logarithmic response receivers obtained using RSSI stages are abundantly available in many communication ICs. The logarithmic response allows the system receiver to operate in very close proximity from the transmitter without overloading the receiver front end during a strong transmitter power. An IF amplifier, for example the MC13158 which includes a logarithmically-responding RSSI, is suitable to process the encoded signal (314) of FIG. 3. Because of its logarithmic response, the RSSI permits the receiver and transmitter to operate in close proximity without the risk of overloading the receiver front-end. This is especially desirable in diffused IR applications where receivers must detect not only weak signals reflected off nearby objects, ceilings, walls, etc, but also strong signals from other units operating in close proximity. Another benefit of RSSI receivers with threshold is that there is no falsing in the absence of data as is the case with noise limiting receivers because the detection threshold is located above the noise floor. Ac-coupled limiting receivers typically employ squelch.

Because of the relatively inherent slow RSSI fall time, RSSI receivers can best operate with low duty cycle signals such as the disclosed pulse transmission scheme. A slow RSSI fall time combined with the double pulses resulting from the differentiation process at the rise and fall edges of the finite width pulses (404), requires a less than 50% duty cycle signal at the RSSI receiver input for proper operation so that the RSSI has enough time to recover before it is ready to respond to further incoming pulses. Pulse transmission which is inherently low duty cycle is therefore very much suited for the RSSI receiver approach. The highest duty cycle found in the encoded signal (314) is 25% using a pulse width equal to ⅛th the Manchester bit time which is the case in the current implementation. Generally, the maximum pulse duration is selected based on the RSSI speed and response time. The RSSI stage of the MC13155 Motorola IF IC for example can adequately respond to 300 nanosecond-wide pulses.

Moreover, because of the ac-coupling at the logarithmic receiver output, an advantageous detection tracking mechanism is achieved in which the ac-coupled detected signal moves closer toward a fixed threshold during weak signal reception in order to permit the successful detection of weak signals, and moves away from the detection threshold during strong signal reception in order to minimize the errors caused by occasional noise fluctuation that can falsely trigger the detector. A detailed description of this threshold tracking mechanism is found below.

With reference to the receiver signal diagram of FIG. 4, (402) is the IR signal incident on the photodetector. After pre-amplification by a transimpedance amplifier, it undergoes low-pass and hi-pass filtering (404). The overall cutoff frequency for the hi-pass filter is set very high in order to effectively attenuate most of the background interference. The differentiated signal is then used to drive the logarithmic receiver input. The receiver output (406) responds to both the positive and the negative pulses resulting from the differentiation process. Also, the long tail response of the received signal is evident. The output of the RSSI is then rectified and filtered in order to eliminate the null of (406) resulting in the detected signal-1 (408) which corresponds to a strong signal at the receiver input, and detected signal-2 (410) which corresponds to a weak signal at the receiver input. The two signals (408) and (410) differ not only in their amplitudes but also in their pulse durations, a characteristic of logarithmic receivers as described earlier. Therefore, when the receiver input is strong, the detected signal has larger amplitude and wider duration then when the receiver input is weak. This is used to advantage in this scheme where detected signal (408) and (410) dynamically track the fixed detection threshold as the received signal strength changes.

To better understand this threshold tracking mechanism, signals (408), (410), and a fixed detection threshold (218) of FIG. 2 are drawn on the same coordinates and scale (412) as they would appear after ac-coupling at the logarithmic receiver output. (414), a segment of (412) enclosed inside the ellipse, is magnified for better illustration. The fixed detection threshold (420) is set well above the ac ground (422) to minimize falsing on noise. When the received signal is weak (receiver operating near the maximum range), the detection signal average level is reduced because the detection signal pulses exist for shorter periods of time and smaller amplitudes (410). After ac-coupling at the logarithmic receiver output, this low average level is stripped off by the capacitor pushing detected signal 2 (410) downward only a very slight amount corresponding to the low average level. In this case, the threshold level is set close enough to allow detected signal 2 (410) to be successfully detected.

When the detected signal 1 is strong (408), the detected signal average level is large. Ac-coupling strips off this high average level pushing the detected signal 1 (408) downward a much larger amount. In this case the high peaks of the strong detected signal 1 (408) cross the same threshold and are successfully detected while the noise floor of detected signal 1 (408) is pushed further below the threshold.

This shifting of the signal level compared to the fixed threshold optimizes reception of weak signals using fixed threshold detectors and minimizes detection falsing in strong signal environments.

Figure 5:
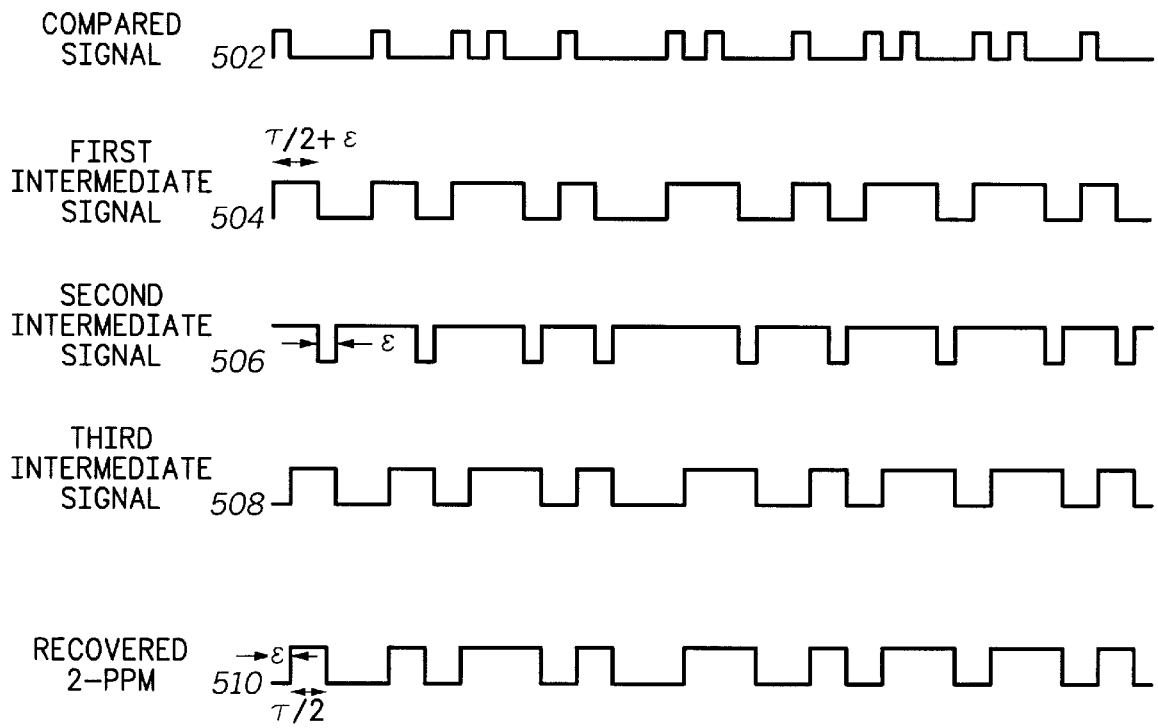
FIG. 5 illustrates a decoder signal diagram in accordance with the present invention.

A decoder implementation is described with reference to the preferred embodiment of FIG. 2 and the decoder signal diagram of FIG. 5.

The compared signal (502) at the output of the fixed threshold comparator (220) is used to drive the decoder (203) circuit in order to recover the original information. (502) is first stretched using a rise edge retriggerable monostable stage with "t=τ/2+ε", "ε" is a small constant used to guarantee retriggering of the monostable during close consecutive pulses. The output of the monostable (222) is shown as a first intermediate signal (504). To correct for the added "ε" value, a fall edge non-retriggerable stage (225) is used with "t=ε". The output (226) is shown as a second intermediate signal (506). The first intermediate signal (504) is then delayed (223) by an amount "ε" using a passive delay element. The result obtained at (224) is shown as a third intermediate signal (508). The second and third intermediate signals (506) and (508) are then multiplied using an AND gate (227). The resulting signal (228) is an "ε-delayed" 2-PPM version of (308). This is shown in the recovered 2-PPM signal of (510). The NRZ data is then easily recovered by Exclusive-Oring the decoded 2-PPM signal (510) with a corresponding clock. The clock is also an "ε-delayed" copy of (306) used in the encoder (205) description.

Figure 6:
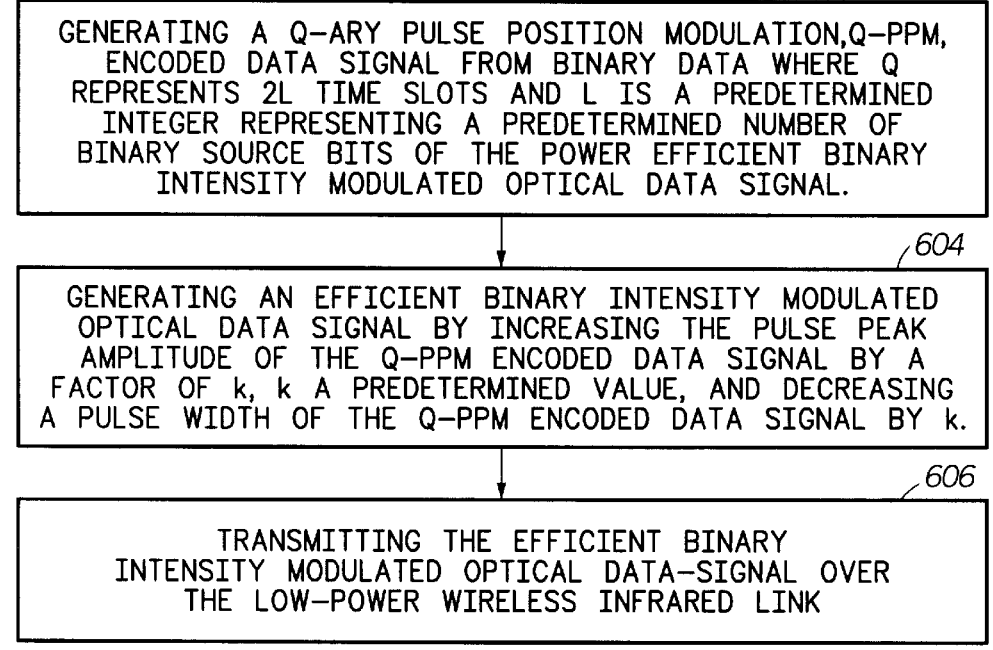
FIGS. 6 and 7 show one embodiment of steps for a waveform encoding/decoding method for generating/receiving a power efficient binary intensity modulated optical data signal from a binary source signal in accordance with the present invention.
Figure 7:
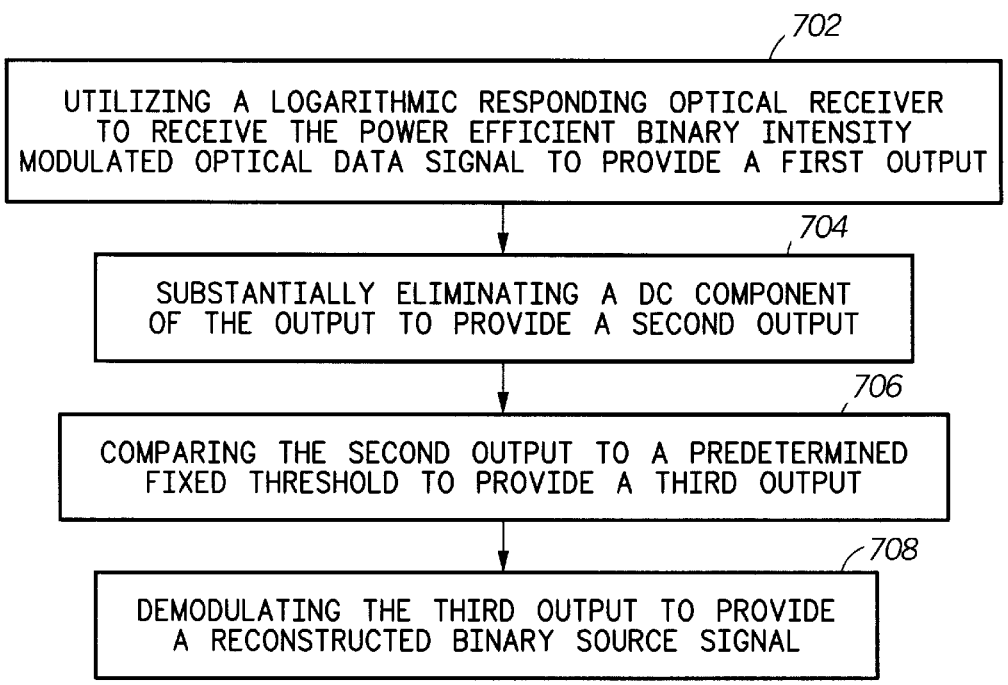

FIGS. 6 and 7, numerals 600 and 700, show one embodiment of steps for a waveform encoding/decoding method for generating/receiving a power efficient binary intensity modulated optical data signal from a binary source signal which minimizes a time between adjacent pulse transitions and maximizes a pulse peak amplitude for transmission over a low-power wireless infrared link in accordance with the present invention. The method includes at least one of A–C and D–G. Steps A–C include, for generating the power efficient binary intensity modulated optical data signal: A) generating(602) a Q-ary pulse position modulation, Q-PPM, encoded data signal from binary data where Q represents $2^L$ time slots and L is a predetermined integer representing a predetermined number of binary source bits of the power efficient binary intensity modulated optical data signal; B) generating (604) an efficient binary intensity modulated optical data signal by increasing the pulse peak amplitude of the Q-PPM encoded data signal by a factor of k, k a predetermined value, and decreasing a pulse width of the Q-PPM encoded data signal by k; and C) transmitting (606) the efficient binary intensity modulated optical data signal over the low-power wireless infrared link. Steps D–G include, for receiving the power efficient binary intensity modulated optical data signal in accordance with the present invention: D) utilizing (702) a logarithmic responding optical receiver to receive the power efficient binary intensity modulated optical data signal to provide a first output; E) substantially eliminating (704) a DC component of the output to provide a second output; F)comparing (706) the second output to a predetermined fixed threshold to provide a third output; and G) demodulating (708) the third output to provide a reconstructed binary source signal.

In one embodiment, transmitting the efficient binary intensity modulated optical data signal may be accomplished in an ambient light environment.

Figure 8:
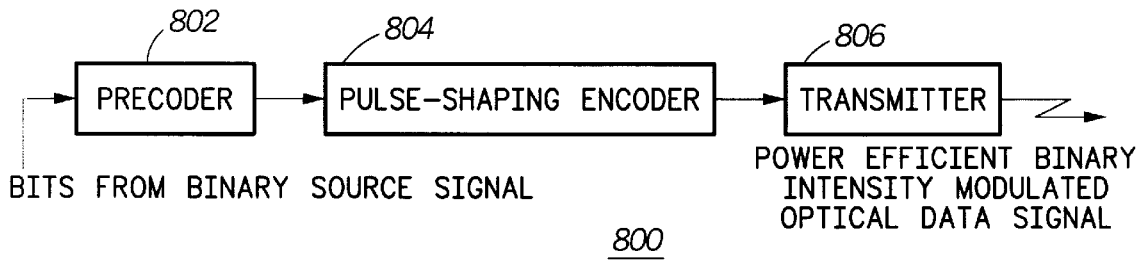
FIGS. 8 and 9 show a block diagram of one embodiment of a waveform encoding/decoding device for generating/receiving a power efficient binary intensity modulated optical data signal from a binary source signal in accordance with the present invention.
Figure 9:
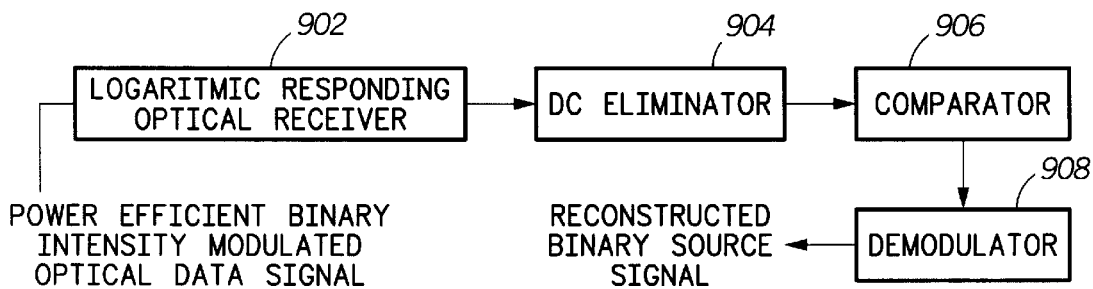

FIGS. 8 and 9, numerals 800 and 900, show a block diagram of one embodiment of a waveform encoding/decoding device for generating/receiving a power efficient binary intensity modulated optical data signal from a binary source signal which minimizes a time between adjacent pulse transitions and maximizes a pulse peak amplitude for transmission over a low-power wireless infrared link in accordance with the present invention. The device includes at least one of an encoder (800) and a decoder (900). The encoder (800) includes: A) a precoder (802), coupled to receive bits from the binary source signal, for generating a Q-ary pulse position modulation, Q-PPM, encoded data signal from binary data where Q represents $2^L$ time slots and L is a predetermined integer representing a predetermined number of binary source bits of the power efficient binary intensity modulated optical data signal; B) a pulse-shaping encoder (804), coupled to the precoder (802), for generating an efficient binary intensity modulated optical data signal by increasing the pulse peak amplitude of the Q-PPM encoded data signal by a factor of k, k a predetermined value, and decreasing a pulse width of the Q-PPM encoded data signal by k; and C) a transmitter (806), coupled to the pulse-shaping encoder, for transmitting the power efficient binary intensity modulated optical data signal over the low-power wireless infrared link. The decoder (900) includes: A) a logarithmic responding optical receiver (902), for receiving the power efficient binary intensity modulated optical data signal to provide a first output; B) a DC eliminator (904), coupled to the logarithmic responding optical receiver (902), for substantially eliminating a DC component of the output to provide a second output; C) a comparator (906), coupled to the DC eliminator (904), for comparing the second output to a predetermined fixed threshold to provide a third output; and D) a demodulator (908), coupled to the comparator (906), for demodulating the third output to provide a reconstructed binary source signal.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalenc

We claim:

1. A waveform encoding/decoding method for generating/receiving a power efficient binary intensity modulated optical data signal from a binary source signal which minimizes a time between adjacent pulse transitions and maximizes a pulse peak amplitude for transmission over a low-power wireless infrared link, comprising the steps of at least one of A–C and D–G:

for generating the power efficient binary intensity modulated optical data signal:
  A) generating a Q-ary pulse position modulation, Q-PPM, encoded data signal from binary data where Q represents $2^L$ time slots and L is a predetermined integer representing a predetermined number of binary source bits of the power efficient binary intensity modulated optical data signal;
  B) generating an efficient binary intensity modulated optical data signal by increasing the pulse peak amplitude of the Q-PPM encoded data signal by a factor of k, k a predetermined value, and decreasing a pulse width of the Q-PPM encoded data signal by k;

C) transmitting the efficient binary intensity modulated optical data signal over the low-power wireless infrared link; and for receiving the power efficient binary intensity modulated optical data signal:

D) utilizing a logarithmic responding optical receiver to receive the power efficient binary intensity modulated optical data signal to provide a first output;

E) substantially eliminating a DC component of the output to provide a second output;

F) comparing the second output to a predetermined fixed threshold to provide a third output;

G) demodulating the third output to provide a reconstructed binary source signal.

2. The waveform encoding method of claim 1 wherein transmitting the efficient binary intensity modulated optical data signal is accomplished in an ambient light environment.

3. A waveform encoding method for generating/receiving a power efficient binary intensity modulated optical data signal from a binary source signal which minimizes a time between adjacent pulse transitions and maximizes a pulse peak amplitude for transmission over a low-power wireless infrared link, the method comprising the steps of:

A) generating a Q-ary pulse position modulation, Q-PPM, encoded data signal from binary data where Q represents $2^L$ time slots and L is a predetermined integer representing a predetermined number of binary source bits of the power efficient binary intensity modulated optical data signal;

B) generating an efficient binary intensity modulated optical data signal by increasing the pulse peak amplitude of the Q-PPM encoded data signal by a factor of k, k a predetermined value, and decreasing a pulse width of the Q-PPM encoded data signal by k;

C) transmitting the efficient binary intensity modulated optical data signal over the low-power wireless infrared link.

4. The waveform encoding method of claim 1 wherein transmitting the efficient binary intensity modulated optical data signal is accomplished in an ambient light environment.

5. A waveform encoding/decoding device for generating/receiving a power efficient binary intensity modulated optical data signal from a binary source signal which minimizes a time between adjacent pulse transitions and maximizes a pulse peak amplitude for transmission over a low-power wireless infrared link, the device comprising at least one of an encoder and a decoder:

the encoder comprising:

A) a precoder, coupled to receive bits from the binary source signal, for generating a Q-ary pulse position modulation, Q-PPM, encoded data signal from binary data where Q represents $2^L$ time slots and L is a predetermined integer representing a predetermined number of binary source bits of the power efficient binary intensity modulated optical data signal;

B) a pulse-shaping encoder, coupled to the precoder, for generating an efficient binary intensity modulated optical data signal by increasing the pulse peak amplitude of the Q-PPM encoded data signal by a factor of k, k a predetermined value, and decreasing a pulse width of the Q-PPM encoded data signal by k;

C) a transmitter, coupled to the pulse-shaping encoder, for transmitting the power efficient binary intensity modulated optical data signal over the low-power wireless infrared link; and the decoder:

D) a logarithmic responding optical receiver, for receiving the power efficient binary intensity modulated optical data signal to provide a first output;

E) a DC eliminator, coupled to the logarithmic responding optical receiver, for substantially eliminating a DC component of the output to provide a second output;

F) a comparator, coupled to the DC eliminator, for comparing the second output to a predetermined fixed threshold to provide a third output;

G) a demodulator, coupled to the comparator, for demodulating the third output to provide a reconstructed binary source signal.

6. The waveform encoding device of claim 5 wherein the transmitter transmits the efficient binary intensity modulated optical data signal in an ambient light environment.

7. A waveform decoding device for receiving a power efficient binary intensity pulse position modulation (PPM) optical data signal from a binary source signal which minimizes a time between adjacent pulse transitions and maximizes a pulse peak amplitude for transmission over a low-power wireless infrared link, the device comprising:

a logarithmic responding optical receiver, for receiving the power efficient binary intensity PPM optical data signal to provide a first output;

a DC eliminator, coupled to the logarithmic responding optical receiver, for substantially eliminating a DC component of the output to provide a second output;

a comparator, coupled to the DC eliminator, for comparing the second output to a predetermined fixed threshold to provide a third output; and a demodulator, coupled to the comparator, for demodulating the third output to provide a reconstructed binary source signal.

8. The waveform decoding device of claim 7 wherein the logarithmic responding optical receiver receives the efficient binary intensity PPM optical data signal in the ambient light environment.

* * * * *